United States Patent
Shin et al.

(10) Patent No.: US 10,763,044 B2
(45) Date of Patent: *Sep. 1, 2020

(54) ACRYLIC BINDER AND MULTILAYER ELECTRONIC COMPONENT USING THE SAME

(71) Applicant: SAMSUNG ELECTRO-MECHANICS CO., LTD., Suwon-si, Gyeonggi-do (KR)

(72) Inventors: Yu Ra Shin, Suwon-si (KR); Myeong Gi Kim, Suwon-si (KR); Eung Soo Kim, Suwon-si (KR); Hak Kwan Kim, Suwon-si (KR); Jang Yeol Lee, Suwon-si (KR); Seong Min Chin, Suwon-si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/516,612

(22) Filed: Jul. 19, 2019

(65) Prior Publication Data
US 2019/0341192 A1 Nov. 7, 2019

Related U.S. Application Data

(63) Continuation of application No. 15/675,102, filed on Aug. 11, 2017, now Pat. No. 10,403,436.

(30) Foreign Application Priority Data

Dec. 19, 2016 (KR) .......................... 10-2016-0173764

(51) Int. Cl.
*H01G 4/30* (2006.01)
*H01G 4/12* (2006.01)
(Continued)

(52) U.S. Cl.
CPC ........... *H01G 4/30* (2013.01); *C04B 35/4682* (2013.01); *C04B 35/63424* (2013.01);
(Continued)

(58) Field of Classification Search
CPC ........ H01G 4/30; H01G 4/008; H01G 4/1218; C08K 3/042; C04B 35/4682;
(Continued)

(56) References Cited

U.S. PATENT DOCUMENTS 9,334,386 B2   5/2016  Alsharaeh et al.
10,403,436 B2 * 9/2019  Shin
(Continued)

FOREIGN PATENT DOCUMENTS

CN   105085948 A   11/2015
CN   105575664 A   5/2016
(Continued)

OTHER PUBLICATIONS

First Office Action issued in Chinese Application No. 201711089546.9 dated Jul. 3, 2019, with English abstract.
(Continued)

*Primary Examiner* — Dion Ferguson
(74) *Attorney, Agent, or Firm* — Morgan, Lewis & Bockius LLP

(57) ABSTRACT

A multilayer electronic component includes a body having a stacked structure in which a plurality of internal electrodes and dielectric layers are alternately stacked; and external electrodes disposed on an outer surface of the body and connected to the internal electrodes. The dielectric layer includes a plurality of grains and a plurality of graphene particles, and the plurality of graphene particles are disposed at boundaries of the plurality of grains.

16 Claims, 2 Drawing Sheets

(51) Int. Cl.
  *H01G 4/008*   (2006.01)
  *C08K 3/04*    (2006.01)
  *C04B 35/468*  (2006.01)
  *C04B 35/634*  (2006.01)

(52) U.S. Cl.
  CPC ............. *C08K 3/042* (2017.05); *H01G 4/008* (2013.01); *H01G 4/1218* (2013.01); *C04B 2235/3236* (2013.01); *C04B 2235/422* (2013.01); *C04B 2235/425* (2013.01); *C04B 2235/48* (2013.01); *C04B 2235/528* (2013.01); *C04B 2235/5445* (2013.01); *C04B 2235/5454* (2013.01); *C04B 2235/721* (2013.01)

(58) Field of Classification Search
  CPC ...... C04B 2235/3236; C04B 2235/422; C04B 2235/48
  See application file for complete search history.

(56) References Cited

U.S. PATENT DOCUMENTS

| 2013/0135789 A1 | 5/2013 | Kim et al. |
| 2013/0184143 A1 | 7/2013 | Corral et al. |
| 2015/0053900 A1 | 2/2015 | Kim et al. |
| 2016/0126014 A1 | 5/2016 | Lee et al. |
| 2017/0229251 A1 | 8/2017 | Moon et al. |

FOREIGN PATENT DOCUMENTS

| KR | 10-1994-0002878 A | 2/1994 |
| KR | 10-2011-0007797 A | 1/2011 |
| KR | 10-2014-0060070 A | 5/2014 |
| KR | 10-2015-0128743 A | 11/2015 |
| WO | 2014/158970 A1 | 10/2014 |
| WO | 2016/042419 A2 | 3/2016 |

OTHER PUBLICATIONS

Notice of Allowance issued in U.S. Appl. No. 15/675,102 dated Apr. 12, 2019.
Final Office Action issued in U.S. Appl. No. 15/675,102 dated Feb. 11, 2019.
Non-Final Office Action issued in U.S. Appl. No. 15/675,102 dated Aug. 9, 2018.
Second Office Action issued in corresponding Chinese Patent Application No. 201711089546.9 dated May 18, 2020, with English translation.

\* cited by examiner

US 10,763,044 B2

ACRYLIC BINDER AND MULTILAYER ELECTRONIC COMPONENT USING THE SAME

CROSS-REFERENCE TO RELATED APPLICATION(S)

This application is the continuation application of U.S. patent application Ser. No. 15/675,102 filed Aug. 11, 2017, now allowed, which claims the benefit of priority to Korean Patent Application No. 10-2016-0173764 filed Dec. 19, 2016 in the Korean Intellectual Property Office, the disclosure of both are incorporated herein by reference in their entirety.

BACKGROUND

1. Field

The present disclosure relates to an acrylic binder and a multilayer electronic component manufactured using the same, in which the acrylic binder may be an acrylic copolymer-graphene binder and the multilayer electronic component may be a multilayer ceramic capacitor (MLCC).

2. Description of Related Art

Generally, ceramic electronic components using a ceramic material, such as a capacitor, an inductor, a piezoelectric element, a varistor, or a thermistor may include a ceramic body formed of the ceramic material, an internal electrode formed in the ceramic body, and an external electrode installed on a surface of the ceramic body to be connected to the internal electrode.

Among the ceramic electronic components, a multilayer ceramic capacitor includes a plurality of dielectric layers that are stacked, internal electrodes aligned, having dielectric layers interposed therebetween, and external electrodes electrically connected to the internal electrodes.

According to Korean Patent Laid-Open Publication No. 10-2011-007797, to provide an MLCC having excellent reliability, in which the occurrence rate of cracking and blistering is low, at least one of the internal electrodes includes oxide containing Ni, but a dielectric sheet on which an internal electrode is printed is still at an ordinary technical level.

SUMMARY

An aspect of the present disclosure may provide a multilayer electronic component having excellent mechanical properties and a thin thickness and an acrylic binder capable of implementing the multilayer electronic component having the above properties.

According to an aspect of the present disclosure, a multilayer electronic component includes: a body having a stacked structure in which a plurality of internal electrodes and dielectric layers are alternately stacked and external electrodes disposed on an outer surface of the body and connected to the internal electrodes. The dielectric layer includes a plurality of grains and graphene particles disposed at a boundary of the plurality of grains.

According to another aspect of the present disclosure, an acrylic binder may include an acrylic copolymer-graphene composite.

According to another aspect of the present disclosure, a dielectric material includes a plurality of grains and a composite including an acrylic copolymer and graphene particles.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

Hereinafter, the multilayer electronic component and the acrylic binder according to exemplary embodiments in the present disclosure will be described, but the exemplary embodiments of the present disclosure are not limited thereto.

Multilayer Electronic Component

Figure 1:
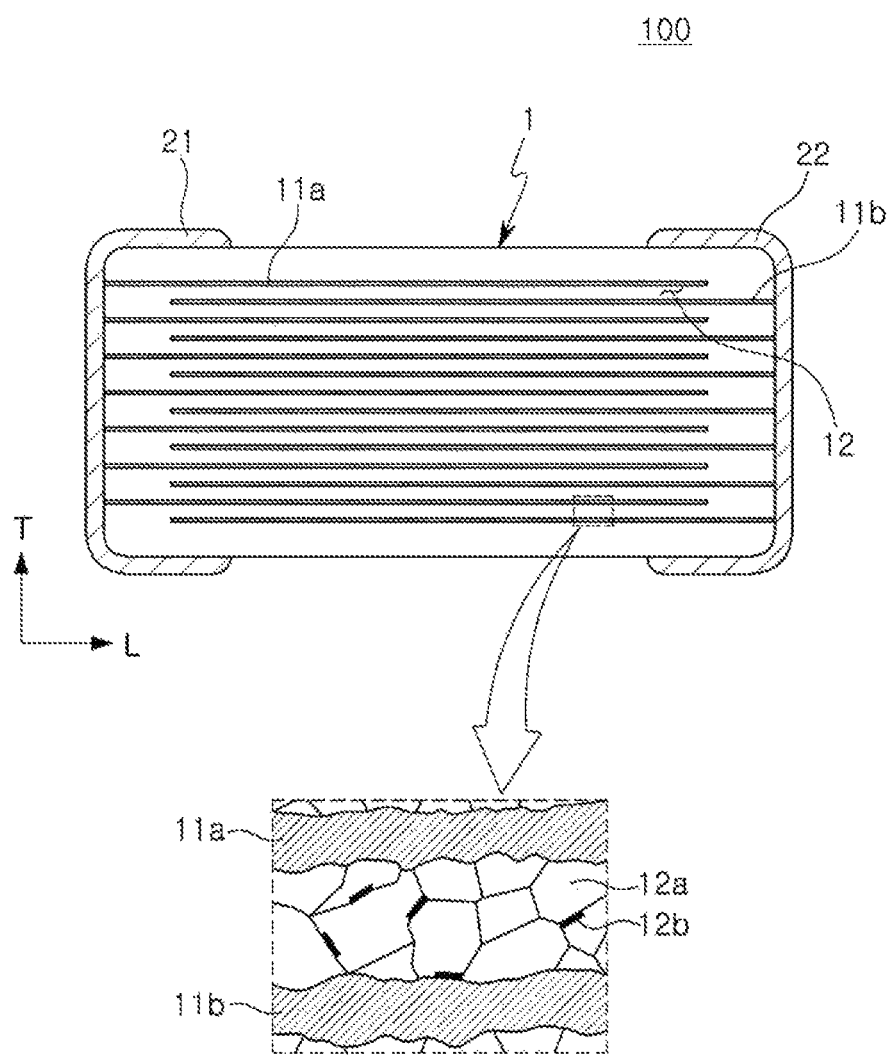
FIG. 1 is a schematic cross-sectional view of a multilayer electronic component according to an exemplary embodiment in the present disclosure.

FIG. 1 is a schematic cross-sectional view of a multilayer electronic component according to an exemplary embodiment in the present disclosure.

Referring to FIG. 1, a multilayer electronic component 100 may include a body 1 and first and second external electrodes 21 and 22 disposed on an outer surface of the body.

The first and second external electrodes 21 and 22 are respectively electrically connected to first and second internal electrodes 11a and 11b disposed in the body to configure a capacitor circuit. The conductive material contained in the first and second external electrodes is not particularly limited, but may include nickel (Ni), copper (Cu), and alloys thereof.

The body 1 may form the overall appearance of the multilayer electronic component and may have substantially a hexahedral shape, including an upper surface and a lower surface facing each other in a thickness direction T, a first end surface and a second end surface facing each other in a direction of a length L, and a first end surface and a second end surface facing each other in a width (W) direction, but is not limited thereto. Here, the thickness (T) direction means a stacking direction.

The body 1 may have a structure in which a plurality of internal electrodes 11a and 11b and a plurality of dielectric layers 12 may be alternately stacked along the stacking direction.

The internal electrodes 11a and 11b are formed of a conductive material but the material of the internal electrodes 11a and 11b may not be particularly limited. For example, the material of the internal electrodes 11a and 11b may include silver (Ag), nickel (Ni), copper (Cu), palladium (Pd), a silver-palladium (Ag—Pd) alloy, a gold (Au) alloy, and the like.

A thickness of the internal electrode may be properly set according to the purpose. The thickness of the internal electrode may be within a range from 100 nm to 600 nm. If the thickness of the internal electrode is within the above range, it may be advantageous to prevent the deterioration in the internal electrode and miniaturize the chip while having appropriate mechanical strength.

The internal electrode may be disposed on the upper surface of the dielectric layer 12 that includes a material having dielectric properties. In this case, as the material having the dielectric properties, a ceramic material may be preferably used.

Specifically, the dielectric layer 12 may include a perovskite type compound including Ba and Ti. In general, the perovskite type compound may be represented by the general formula $AyBO_3$ (A: A site element, B: B site element, O: oxygen, y: ratio of A site element/B site element) of the crystal structure. For example, the dielectric layer may include $BaTiO_3$.

The dielectric layer 12 may include Ca, Zr, Mn, and the like, in addition to Ba and Ti. In addition, the dielectric layer 12 may also include a rare earth element RE as a subcomponent.

The dielectric layer 12 may include dielectric grains 12a included in the dielectric layer by sintering, and an average particle size of the dielectric grains may be within a range from 30 nm to 200 nm. If the average particle size of the dielectric grain is smaller than 30 nm, it is difficult to realize a sufficient dielectric constant and if the dielectric particle size is larger than 200 nm, DC bias characteristics may be poor and an IR deterioration phenomenon may occur.

A shape of a dielectric grain 12a in the dielectric layer may mostly have a hexagonal cross section, but is not limited thereto.

A thickness of each of the dielectric layers 12 may be within a range from 100 nm to 1000 nm. If the thickness of each of the dielectric layers 12 is smaller than 100 nm, when a voltage is applied to the multilayer electronic component, an excessive electric field may be applied to the multilayer electronic component and thus an insulation resistance of the multilayer electronic component may deteriorate, such that the multilayer electronic component may not properly work as a capacitor and if the thickness of each of the dielectric layers 12 is larger than 1000 nm, the capacitance of the capacitor per unit area may be reduced, such that it may be difficult to implement the high capacity capacitor.

The dielectric layer 12 may include the dielectric grains 12a and graphene particles 12b.

The graphene particles 12b may be disposed at boundaries between the dielectric grains 12a. Here, the fact that the graphene particles are disposed at the boundary of the dielectric grains may mean that the graphene particles are disposed on an interface at which separate dielectric grains adjacent to each other are distinguished.

The graphene particles 12b may be included only in the dielectric layer and may not penentrate into the inside of the internal electrode disposed on the dielectric layer. Further, depending on the product, the graphene particles may be placed on a boundary line between the dielectric layer and the internal electrode. However, this may mean that the graphene particles are not placed inside the internal electrode but placed at the boundary of the dielectric grains.

The shape of the graphene particle 12b may have a plate shape or a ribbon shape. It is to be understood that the plate shape collectively refers to a structure capable of distinguishing between a major axis and a minor axis, and the ribbon shape generally refers to a long string shape.

The graphene particles 12b may be irregularly dispersed in the respective dielectric layers.

This is similar to the case where the graphene particles are discontinuously placed with other adjacent graphene particles.

The content of the graphene particles 12b may be within a range from 100 ppm to 5000 ppm based on the number of dielectric grains having a particle size of 50 nm or more in the dielectric layer. If the content of the graphene particles is less than 100 ppm, the mechanical properties such as tensile strength or elongation of the dielectric layer may be inadequate and thus the case where the dielectric layer includes the graphene particles may be little distinguished from the case where the dielectric layer does not include the graphene particles. When the content of the graphene particles is greater than 5000 ppm, however, an interlayer electrical connection path of the internal electrode may be generated because the graphene is a conductive material and thus a short circuit may occur.

On the other hand, residual carbon material derived from a PVB-based binder may not be included in the dielectric layer 12 at all. In general, if the dielectric layer is formed in a multilayer ceramic capacitor, the PVB-based binder may be mostly used. The reason is that the PVB-based binder serves to prevent a dielectric sheet from being torn because it has strength above a certain level when the dielectric sheet is molded into a PET film and then peeled off. However, the PVB-based binder may increase the amount of residual carbon in the final chip after the firing process.

However, the multilayer electronic component according to an exemplary embodiment in the present disclosure may not include the residual carbon derived from the PVB-based binder generally included in the dielectric layer at all. The reason is that when the dielectric layer is manufactured, the PVB-based binder is not used but the acrylic binder to be described below is used. In particular, since the acrylic binder forms a complex of graphene remaining in the dielectric layer together with an acrylic copolymer, it is possible to sufficiently secure the mechanical strength while significantly reducing the amount of residual carbon.

However, it is impossible to know the source of residual carbon in the dielectric layer and it is possible to indirectly deduce that the PVB-based binder is not used based on the significant decrease in the amount of residual carbon in the dielectric layer. Specifically, it may be seen that the amount of residual carbon is significantly reduced, based on 0.1 wt % or more and 10 wt % or less of carbon with respect to the entire content in the respective dielectric layers. In this case, although the amount of residual carbon tends to increase with an increase in the content of the dielectric material included to form the dielectric layer, for example, barium titanate, it may be preferable that the amount of residual carbon does not exceed 10 wt %, based on a total weight of the dielectric layer.

Hereinafter, the acrylic binder according to another exemplary embodiment in the present disclosure will be described in detail, using a simple process for manufacturing the above-described multilayer electronic component 100.

Acrylic Binder

An acrylic binder according to another exemplary embodiment in the present disclosure may include an acrylic copolymer-graphene composite.

Figure 2:
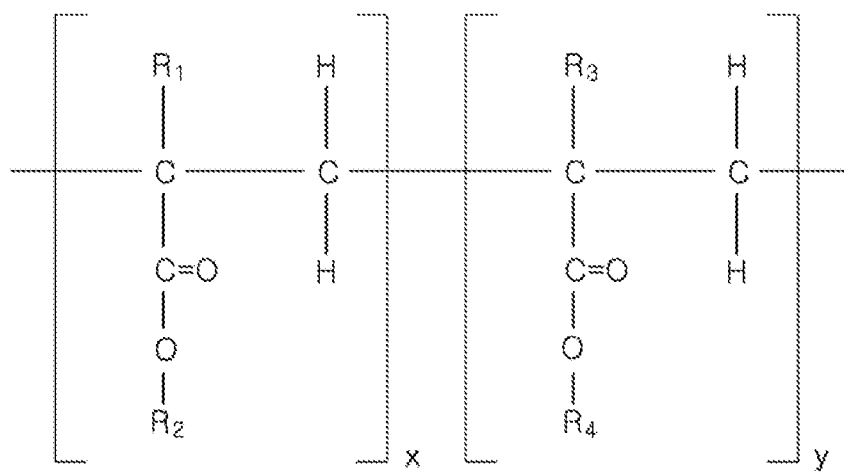
FIG. 2 is a schematic structural view of some component of an acrylic binder according to another exemplary embodiment in the present disclosure.

The acrylic copolymer included in the acrylic copolymer-graphene composite may have the structure of FIG. 2.

Referring to FIG. 2, $R_1$ and $R_3$ may include functional groups each selected from the group consisting of H, $CH_3$, and $C_2H_5$, and $R_2$ and $R_4$ may include functional groups each selected from the group consisting of $CH_3$ (MMA), $C_2H_5OH$ (HEMA), and $C_4H_9$ (BMA). However, the MMA may refer to methyl methacrylate, the hydroxyethyl methacrylate (HEMA) may refer to butyl methacrylate (BMA), and x and y may mean positive integers such as 1, 2, 3, and so on.

A single composite may be provided by bonding the acrylic copolymer of FIG. 2 to the graphene. The graphene may be one of graphene oxide (GO), positively charged reduced graphene oxide (rGO), and graphene modified by chemical modification.

In the complex, the acrylic copolymer and graphene may undergo chemical and physical interactions such as hydrogen bonding and nucleophilic reaction to form the single composite.

Figure 3:
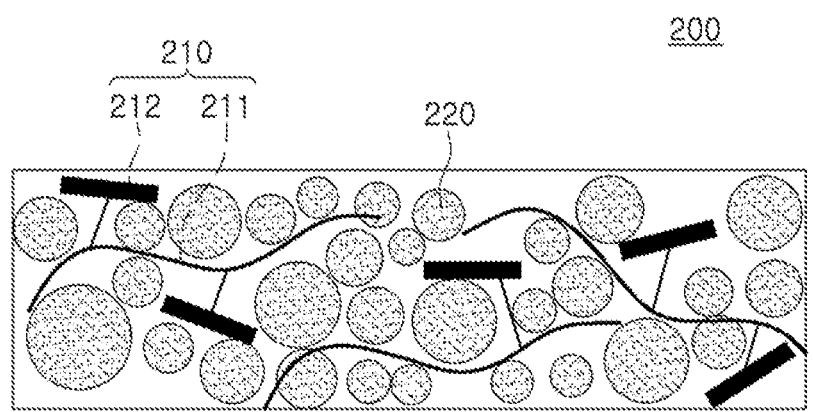
FIG. 3 is a schematic diagram of a ceramic green sheet.

FIG. 3 is a schematic diagram of a ceramic green sheet including the acrylic copolymer-graphene composite.

Referring to FIG. 3, a ceramic green sheet 200 may include an acrylic copolymer-graphene composite 210 consisting of an acrylic copolymer 211 and a graphene 212 bonded thereto. Further, the ceramic green sheet 200 may include a material 220 having dielectric properties, for example, a barium titanate composition. Although not shown, in addition to the binder and the material having dielectric characteristics, a solvent may also be included to prepare a slurry for configuring a ceramic green sheet.

The body may be individually manufactured by printing the internal electrode on the ceramic green sheet 200 and alternately laminating a plurality of ceramic green sheets and internal electrodes and then performing the firing and the dicing thereon.

In this case, the body has a structure including the graphene included in the acrylic binder together with the material having the dielectric properties included in the ceramic green sheet. It may be preferable that the body does not include the material derived from the acrylic copolymer contained in the acrylic binder, which means that the body does not include unnecessary residues derived from the acrylic binder, for example, residual carbon or the like.

Then, as the operation of disposing an external electrode on an outer surface of the body, the typical external electrode forming operation, for example, dipping or the like, may be applied to complete the final multilayer electronic component.

The multilayer electronic component manufactured using the acrylic binder described above may have excellent mechanical and electrical properties because the amount of residual carbon is greatly reduced due to the use of a binder having a low thermal decomposition temperature and a fast decomposition rate. At the same time, the multilayer electronic component may greatly improve the mechanical strength by including the graphene particles derived from the acrylic binder in the dielectric layer and have a high dielectric constant due to the effect of the dielectric polarization or the thinness of the dielectric layer.

As set forth above, it is possible to provide a multilayer electronic component capable of simultaneously implementing the miniaturization and the improvement in reliability while implementing the high dielectric constant by increasing the polarization of the dielectric layer.

While exemplary embodiments have been shown and described above, it will be apparent to those skilled in the art that modifications and variations could be made without departing from the scope of the present invention as defined by the appended claims.

What is claimed is:

1. A multilayer electronic component, comprising:
   a body having a stacked structure in which a plurality of internal electrodes and dielectric layers are alternately stacked; and
   external electrodes disposed on an outer surface of the body and connected to the internal electrodes,
   wherein the plurality of internal electrodes are alternately exposed to opposing side surfaces of the body, each dielectric layer includes a plurality of dielectric grains and a plurality of graphene particles, and the plurality of graphene particles are disposed at boundaries of the plurality of dielectric grains, and
   a content of residual carbon in the dielectric layer having the graphene particles is within a range from 0.1 wt % to 10 wt % with respect to a total weight of the dielectric layer.

2. The multilayer electronic component of claim 1, wherein the plurality of graphene particles are dispersed irregularly in the dielectric layer.

3. The multilayer electronic component of claim 1, wherein a graphene particle of the plurality of graphene particles is spaced apart from other graphene particles of the plurality of graphene particles adjacent thereto.

4. The multilayer electronic component of claim 1, wherein the dielectric layer includes a ceramic material.

5. The multilayer electronic component of claim 4, wherein the ceramic material includes a perovskite type compound including Ba and Ti.

6. The multilayer electronic component of claim 1, wherein a thickness of the dielectric layer is within a range from 100 nm to 1000 nm.

7. The multilayer electronic component of claim 1, wherein the graphene particles do not penetrate into the internal electrode.

8. The multilayer electronic component of claim 1, wherein an average particle size of the plurality of grains is within a range from 30 nm to 200 nm.

9. The multilayer electronic component of claim 1, wherein a content of the graphene particles included in the dielectric layer is within a range from 100 ppm to 5000 ppm with respect to a number of the grains having a particle size of 50 nm or more in the dielectric layer.

10. The multilayer electronic component of claim 1, wherein the graphene particle has a plate shape or a ribbon shape.

11. The multilayer electronic component of claim 1, wherein the internal electrode includes at least one of nickel (Ni), copper (Cu), silver (Ag), palladium (Pd), silver-palladium alloy, and gold (Au) alloy.

12. The multilayer electronic component of claim 1, wherein a thickness of the internal electrode is within a range from 100 nm to 600 nm.

13. A composition comprising:
   an acrylic binder including a composite of acrylic copolymer-graphene; and
   a material having dielectric properties.

14. The composition of claim 13, wherein the graphene includes at least one of graphene oxide (GO), reduced graphene oxide (rGO), and chemically modified graphene.

15. The composition of claim 14, wherein the acrylic copolymer includes at least one of methyl methacrylate (MMA), butyl methacrylate(BMA), and hydroxyethyl methacrylate (HEMA).

16. The composition of claim 13, wherein the material having dielectric properties includes a barium titanate composition, and the composition further includes a solvent mixed with the acrylic binder having the composite of acrylic copolymer-graphene and the barium titanate composition.

* * * * *